(12) United States Patent
Hala et al.

(10) Patent No.: US 7,970,556 B2
(45) Date of Patent: Jun. 28, 2011

(54) SYSTEM AND METHOD FOR MONITORING THE CONDITION OF A GEAR ASSEMBLY

(75) Inventors: Roger Hala, Gardnerville, NV (US); Charles T Hatch, Gardnerville, NV (US); Adam Weiss, Minden, NV (US); Mel Maalouf, Minden, NV (US); Matthew Kalb, Gardnerville, NV (US); Steven Hadley, Sunol, CA (US)

(73) Assignee: General Electric, Schenectady, NY (US)

( * ) Notice: Subject to any disclaimer, the term of this patent is extended or adjusted under 35 U.S.C. 154(b) by 189 days.

(21) Appl. No.: 12/362,878

(22) Filed: Jan. 30, 2009

(65) Prior Publication Data

US 2010/0198534 A1    Aug. 5, 2010

(51) Int. Cl.
*G01B 3/44* (2006.01)
*G01M 13/00* (2006.01)

(52) U.S. Cl. ........................................................ 702/34
(58) Field of Classification Search ..................... 702/34
See application file for complete search history.

(56) References Cited

U.S. PATENT DOCUMENTS

| | | | |
|---|---|---|---|
| 5,084,696 A * | 1/1992 | Guscott et al. | 340/541 |
| 5,852,793 A * | 12/1998 | Board et al. | 702/56 |
| 6,694,285 B1 | 2/2004 | Choe et al. | |
| 6,711,952 B2 | 3/2004 | Leamy et al. | |
| 7,097,351 B2 | 8/2006 | Lancon et al. | |
| 7,099,782 B2 | 8/2006 | Hitchcock et al. | |
| 7,206,719 B2 | 4/2007 | Lindsay et al. | |
| 7,317,994 B2 | 1/2008 | Iyer et al. | |
| 7,318,007 B2 | 1/2008 | Barkhoudarian | |
| 2005/0149290 A1 * | 7/2005 | Barkhoudarian | 702/182 |

FOREIGN PATENT DOCUMENTS

GB    2 260 815    *    4/1993

* cited by examiner

*Primary Examiner* — Cindy Hien-Dieu Khuu
(74) *Attorney, Agent, or Firm* — Nixon & Vanderhye P.C.

(57) ABSTRACT

A system and method for monitoring the condition of a gear assembly analyzes a signal output by a vibration detector that is attached to the gear assembly. Each time that an amplitude of the signal output from the vibration detector exceeds a threshold value, the system assumes that a debris particle has passed between meshing parts of the gear assembly. The number of times that this occurs, and possibly the amplitude of the vibrations are analyzed to determine a condition of the gear assembly, and possibly a damage index. This system and method are particularly applicable to planetary gear arrangements where the vibration detector can be mounted on a fixed ring gear of the gear assembly, or a structure upon which the fixed ring gear is mounted.

26 Claims, 4 Drawing Sheets

SYSTEM AND METHOD FOR MONITORING THE CONDITION OF A GEAR ASSEMBLY

BACKGROUND OF THE INVENTION

The invention relates to methods of detecting the condition of a gear assembly to predict when the gear assembly is nearing failure.

In most known methods of monitoring the condition of a gear assembly, one attempts to detect vibrations which are generated by the gear assembly as the gears turn and mesh with one another. Through empirical analysis it is possible to determine individual frequencies of vibration which correspond to specific parts of the gear assembly. By detecting the amplitude of a vibration signal at those particular frequencies, it is often possible to determine if an individual element of the gear assembly has begun to fail.

BRIEF DESCRIPTION OF THE INVENTION

In one aspect, the invention could be embodied in a method of monitoring and reporting a condition of a gear assembly which includes the steps of receiving a signal from a vibration detector attached to a portion of the gear assembly, and analyzing the vibration detector signal to determine when debris particles pass between meshing parts of the gear assembly.

In another aspect, the invention could be embodied in a method of calculating a damage index for a gear assembly that includes the steps of receiving a signal from a vibration detector attached to a portion of the gear assembly, determining that a debris particle has passed between meshing parts of the gear assembly each time that an amplitude of the vibration detector signal exceeds a threshold value, counting the number of times that a debris particle passes between meshing parts of the gear assembly over a predetermined period of time to generate an event count, and calculating a damage index for the gear assembly based on the event count.

In another aspect, the invention could be embodied in a system for detecting conditions in a gear assembly. The system could include a vibration detector that is attached to a portion of the gear assembly. The system could also include a processor that compares an amplitude of a signal from the vibration detector to a threshold value and that determines that a debris particle has passed between meshing parts of the gear assembly when the vibration detector signal exceeds the threshold value.

DETAILED DESCRIPTION OF THE INVENTION

Figure 1:
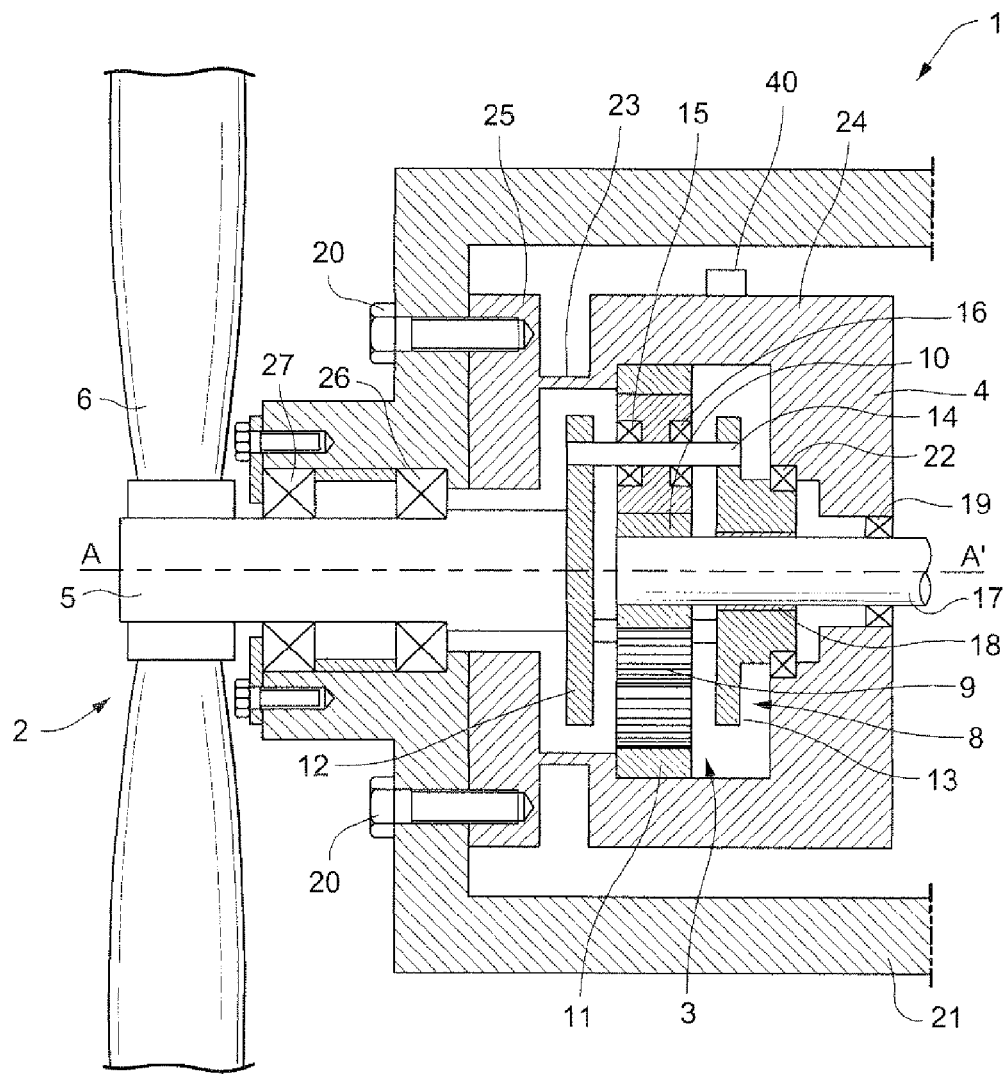
FIG. 1 is a cross-sectional view of planetary gear assembly of a wind turbine.

FIG. 1 illustrates portions of a planetary gear assembly which is used to connect the rotating blades of a wind turbine to an electrical generator. As shown in FIG. 1, a plurality of blades 6 of the wind turbine are connected to a blade shaft 5. The blade shaft 5 is mounted on the wind turbine through bearings 26, 27.

On the other end of the assembly, a rotating shaft 17 is attached to an electrical generator (not shown). A sun gear 10 is mounted on an end of the rotating shaft 17. A plurality of planet gears 9 are located between the sun gear 10 and a ring gear 11. The ring gear 11 is fixed to a housing 24 of the gear assembly.

The planet gears 9 are rotatably mounted on planetary gear shafts 14, which are mounted to a front planetary gear plate 12 and a rear planetary gear plate 13. Typically, the planet gears 9 are rotatably mounted on bearings 15 and 16 which are fixed to the planet gear 9 and the planetary gear shaft 14. This allows the planet gears 9 to freely rotate on the planetary gear shafts 14. The front planetary gear plate 12 is coupled to the blade shaft 5 and rotates with the blade shaft 5. The rear planetary gear plate 13 is rotatably mounted on the housing 24 by bearings 22.

As the blades 6 cause the blade shaft 5 to rotate, the planet gears 9 rotate around the ring gear 11. The planet gears 9, in turn, cause the sun gear 10 and the attached generator shaft 17 to rotate.

In the embodiment shown in FIG. 1, an accelerometer 40 is fixed to the housing 24 which holds the ring gear 14. As a result, any vibrations which are experienced by the ring gear 11 will be transferred through the housing 24 to the accelerometer 40.

In alternate embodiments, the accelerometer 40 could be directly mounted to a side or rear surface of the ring gear 11 itself. In other alternate embodiments, the accelerometer 40 could be mounted to another portion of the gear assembly. In any event, the accelerometer will produce a signal which is indicative of vibrations which are experienced by portions of the gear assembly.

Figure 3:
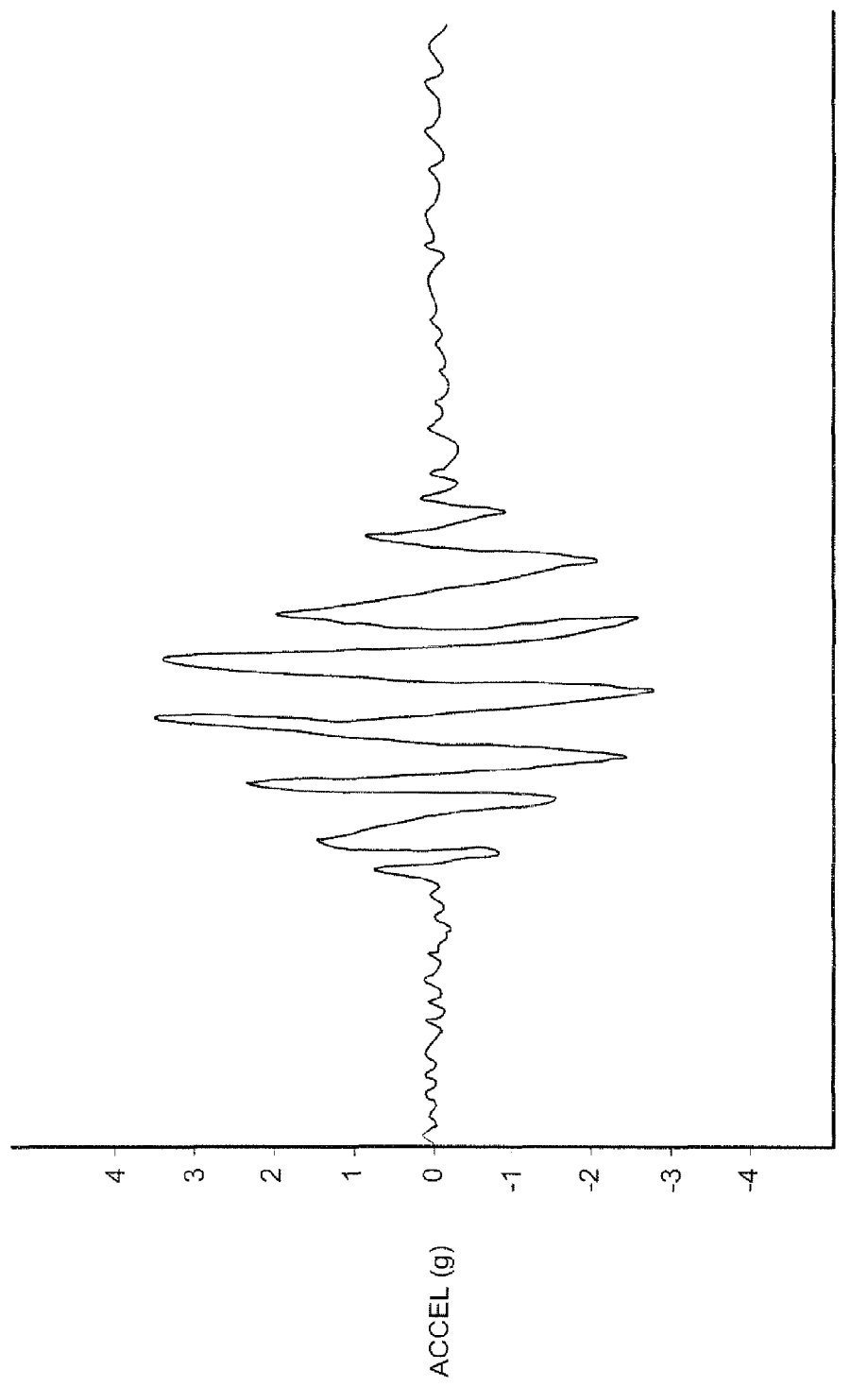
FIG. 3 is a diagram of a signal output by an accelerometer attached to a gear assembly.

FIG. 3 illustrates a typical signal which is output by the accelerometer 40 illustrated in FIG. 1. During normal rotational motions of the planetary gear assembly, the accelerometer will output a relatively low level signal which is indicative of relatively low amounts of vibration. However, if a debris particle within the gear assembly passes between meshing portions of the gear assembly, a sudden vibration will be experienced by the gear assembly and this will cause the accelerometer to output a much larger acceleration signal. For instance, if a debris particle were to pass between the ring gear 11 and one of the planet gears 9, one would expect a sudden vibration to be communicated from the ring gear 11 to the accelerometer 40 through the housing 24. Likewise, if a debris particle were to pass between one of the planet gears 9 and the sun gear 10, one would expect a vibration to be communicated from the planet gear 9 to the accelerometer 40 via the ring gear 11 an the housing 24. As a result, any time that there is a sudden increase in the amplitude of the accelerometer signal, one can assume that a debris particle has passed between two meshing surfaces of the gear assembly.

The inventors have noted that as a gear assembly begins to fail, individual elements of the gear assembly tend to throw off small debris particles. These small debris particles tend to pass between the meshing parts of the gear assembly as the assembly rotates. And, as noted above, one can detect the occurrence of a debris particle passing between meshing parts of the gear assembly by noting when the amplitude of the accelerometer signal suddenly rises. As more damage occurs to the elements of the gear assembly, more and more debris particles circulate within the gear assembly. And passage of the debris particles through the meshing parts of the gear assembly can itself cause additional damage to the meshing elements.

The inventors have developed systems and methods for predicting when a gear assembly is approaching failure by monitoring and analyzing a signal output by one or more accelerometers that are attached to a portion of the gear assembly. The signal can be analyzed in multiple different ways to determine a condition of the gear assembly, and to predict when the gear assembly might be approaching a critical failure point.

The following description will provide some examples of how an accelerometer signal from an accelerometer attached to a gear assembly can be analyzed to determine a condition of the gear assembly, and thereby predict whether the gear assembly is beginning to fail. However, the following examples are only intended to illustrate some possible ways of analyzing the data from an accelerometer. Many other methods which would also fall within the spirit and scope of the invention could also be used to analyze the data from an accelerometer.

FIG. 3 illustrates the amplitude of an accelerometer signal received from an accelerometer attached to a gear assembly, as illustrated in FIG. 1. During typical vibrations, the accelerometer will output a signal that will swing back and forth between positive and negative values. FIG. 3 illustrates that during normal operations of the gear assembly, there is a small amount of vibration present, giving rise to the small amplitude signal. However, when a debris particle passes between meshing portions of the gear assembly (which will hereinafter be referred to as a "debris event"), the amplitude of the accelerometer signal suddenly increases. After the debris particle has passed through the meshing portions of the gear assembly, the amplitude of the accelerometer signal returns to the lower background level.

Figure 4:
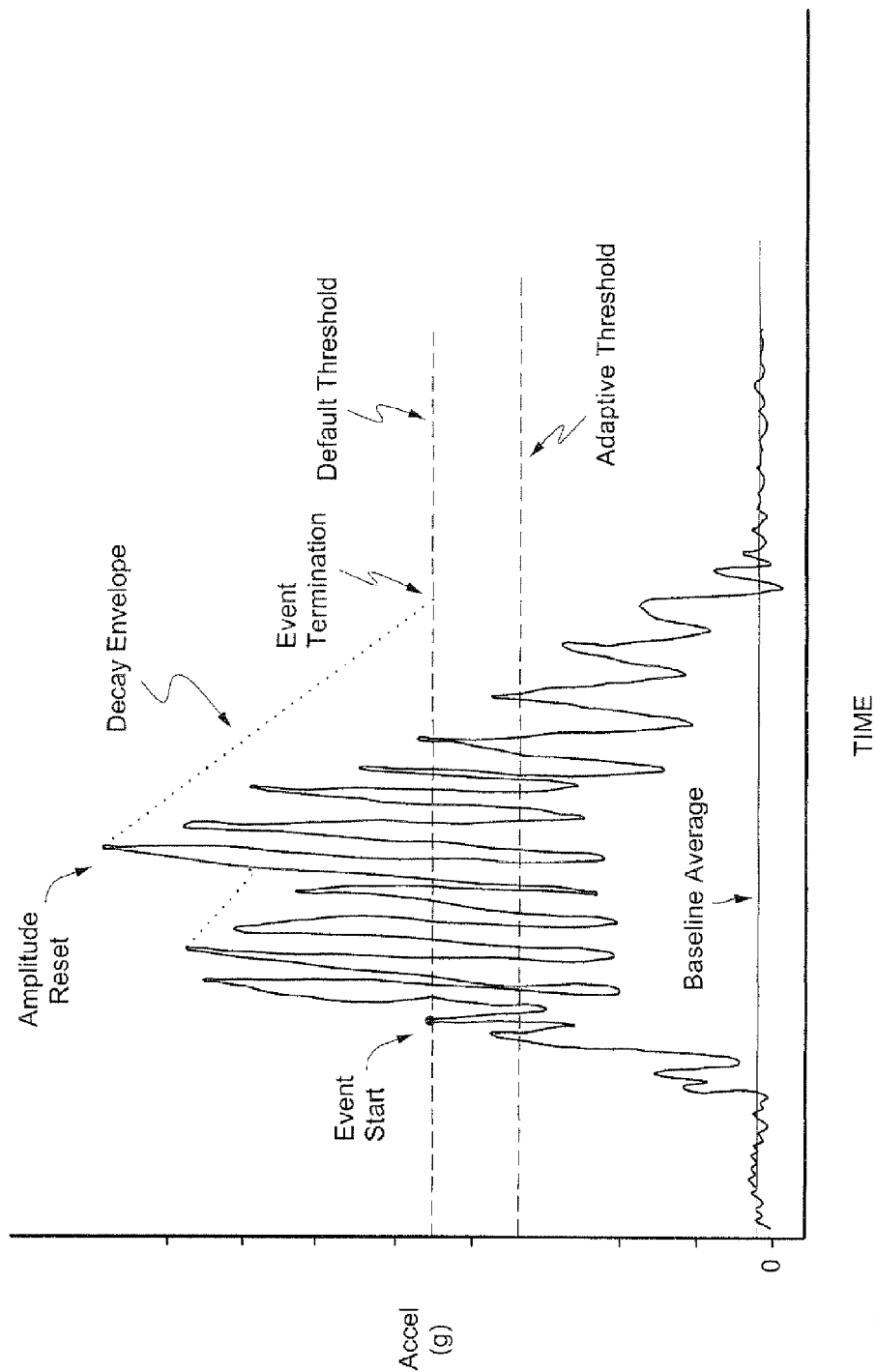
FIG. 4 is a diagram illustrating how an accelerometer signal can be analyzed to determine a condition of a gear assembly.

To provide a signal which is easier to analyze, in some embodiments, the raw accelerometer signal will be normalized. In other words, any negative values are converted to positive values. Or, said in another way, the signal is displayed so that the absolute value of the amplitude is always displayed as a positive value. FIG. 4 shows a normalized presentation of an accelerometer signal which includes beginning and ending portions that merely reflect normal background vibrations, and a mid-portion that reflects the accelerometer signal during a debris event.

As noted above, during normal operations of a gear assembly there will be some level of background vibration which is also present and which gives rise to a relatively low amplitude accelerometer signal. In FIG. 4 the line labeled "baseline average" is an average of the ongoing background vibrations which are present in a gear assembly as the gear assembly operates normally.

Some gear assemblies are intended to operate at a relatively constant rotational speed. In those instances, the baseline average amplitude would not vary much over short periods of time. However, as time passes, and damage begins to accumulate to the elements of the gear assembly, one would expect the baseline average amplitude to gradually rise.

Other gear assemblies are intended to operate at varying rotational speeds. In these types of gear assemblies, the baseline average amplitude, which reflects the level of vibration when no debris event is occurring, would be expected to vary with the rotational speed of the gear assembly. When the gear assembly is rotating slowly, the baseline average amplitude would be low. When the gear assembly rotates faster, the baseline average amplitude would increase. However, even in these types of gear assemblies, one would expect the baseline average amplitudes for low speed operations or higher speed operations to slowly increase over time as damage to the meshing parts of the gear assembly begin to accumulate.

When a debris particle passes between meshing portions of a gear assembly, we expect the amplitude of the accelerometer signal to suddenly increase. But to be sure that an increase in the amplitude of the signal represents a debris event, one can check to determine whether the amplitude of the signal exceeds a threshold value. If the threshold value is exceeded, then one determines that a debris event has occurred.

Of course, relatively small debris particles might pass between the meshing parts of the gear assembly, and the passage might generate small vibrations that do not cause the amplitude of the accelerometer signal to rise above the threshold value. By setting the threshold value to an appropriate level, one can register only those debris events that reflect that significant damage may be occurring to the gear assembly. In other words, in analyzing the accelerometer signal, one seeks to set the threshold value to a level that will result in the recognition of only those debris events that are of real world significance.

The appropriate threshold value level could be considerably different depending on the size and type of gear mechanism. For small and/or delicate gear mechanisms, the amplitude of an accelerometer signal that is indicative of a significant debris event, one which reflects significant damage to the gear assembly, would be quite low. But on a larger and more rugged gear assembly, the amplitude of an accelerometer signal that is indicative of a significant debris event, one which reflects significant damage to the gear assembly, could be quite high. Thus, the appropriate threshold values would need to be set based on the actual circumstances. And some amount of testing and empirical evidence might be needed to select appropriate threshold values.

In the example shown in FIG. 4, there are two threshold lines present. There is an adaptive threshold line and a default threshold line. The default threshold line could be determined empirically by noting the typical level of vibration in a particular type of gear assembly when the gear assembly is new. The default threshold line also could be established by testing a certain gear assembly to failure and noting the level at which debris events begin to give rise to significant damage.

The adaptive threshold line is intended to account for real world circumstances, and the adaptive threshold could change over time to reflect the condition of the gear assembly, and/or the current rotational operating speed of the gear assembly. In one embodiment, the adaptive threshold could be calculated based upon the baseline average. As noted above, the baseline average is an average of the background vibrations that are occurring as the gear assembly is operating without any debris events. The adaptive threshold could be a multiple of the baseline average. For instance, the adaptive threshold could be ten to fifteen times the baseline average. As noted above, because the baseline average would gradually rise over time as damage accumulates, the adaptive threshold would also gradually rise over time. Likewise, if the rotational speed of the gear assembly changes, and the baseline average changes in accordance with rotational speed, the change in rotational speed would also cause a shift in the adaptive threshold.

In some embodiments, one would define a debris event as any time that the amplitude of the accelerometer signal exceeds the greater of the default and adaptive thresholds. In other embodiments, one could define a debris event as any time that the amplitude of the accelerometer signal exceeds the lower of the default and adaptive thresholds.

FIG. 4 shows a situation where the adaptive threshold is below the default threshold. This could reflect a situation where the gear assembly is relatively new, or a situation where the gear assembly is rotating at a relatively low speed. As the gear assembly becomes more worn, the adaptive threshold would likely rise, and might one day exceed the default threshold. Alternatively, of the gear assembly began to rotate at a higher speed, this might also cause the adaptive threshold to exceed the default threshold.

The inventors currently believe that there are two important pieces of information to record as the gear assembly operates. The first piece of information is the number of debris events that occur. And this could be the total number of debris events since the recording began, or the number of debris events that are occurring per unit time. The other piece of information is the maximum amplitude of the accelerometer signal during each debris events. In some embodiments, both items of information are used to determine the condition of the gear assembly, and to predict when the gear assembly is likely to fail. However, in other embodiments, only one of these items of information could be used.

Figure 2:
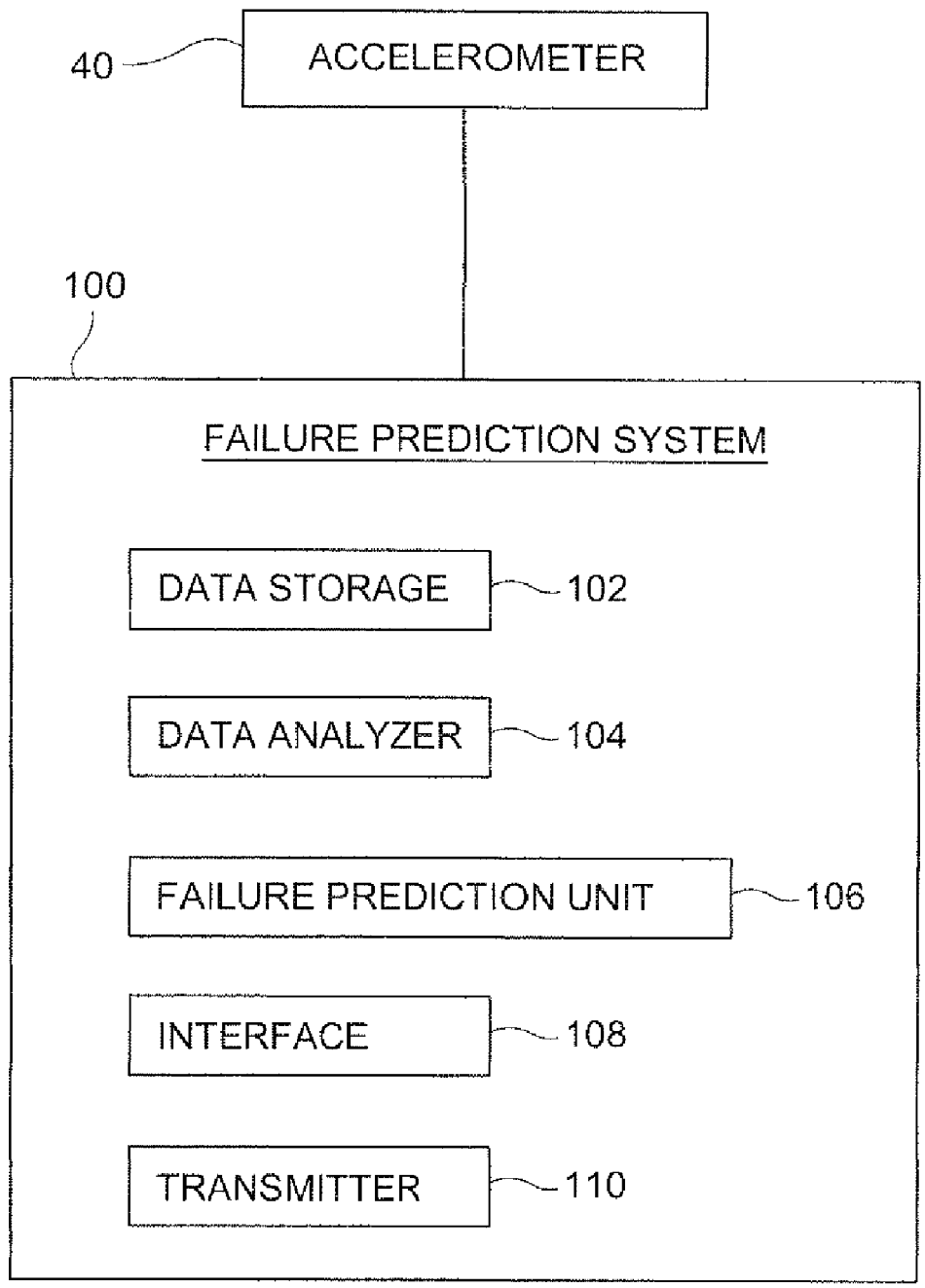
FIG. 2 is a block diagram of a system which can be used to monitor the condition of a gear assembly.

FIG. 2 is an illustration of a system which can be used to detect the condition of a gear assembly and predict when a failure is likely to occur. As shown in FIG. 2, the system includes an accelerometer 40, such as the accelerometer 40 illustrated in FIG. 1. As noted above, the accelerometer could be attached to any portion of the gear assembly which would tend vibrate when a debris event occurs. In some embodiments, a single accelerometer would be used. In alternate embodiments, multiple accelerometer could be used. When multiple accelerometers are used, the accelerometers could be attached to different portions of the gear assembly. The signals from multiple accelerometers could be analyzed separately, or together.

Also, in this description, an accelerometer is used to detect vibrations in a gear assembly caused by a debris event. In alternate embodiments, a different type of sensor could be used to detect the vibrations. Thus, the fact that an accelerometer is used in this description should not be considered limiting.

The accelerometer 40 is connected to a failure prediction system 100. The failure prediction system 100 includes a data storage unit 102, a data analyzer 104, a failure prediction unit 106, an interface 108, and a transmitter 110. Although each of the above listed elements is provided in this embodiment, in alternate embodiments some of these elements may be omitted, and other elements could be added.

In the present embodiment, the accelerometer signal would be monitored and analyzed by the data analyzer 104. The data analyzer 104 would determine when the amplitude of the accelerometer signal exceeds the higher of a default threshold and an adaptive threshold. When this occurs, the data analyzer would determine that a debris event has occurred.

In some embodiments, the data analyzer would increment a counter each time that a debris event occurs. As noted above, a total count for all debris events might be maintained in the data storage unit 102. In other embodiments, the number of debris events per unit time could be calculated by the data analyzer 104 and then stored in the data storage unit 102. In still other embodiments, both the total count and a count per unit time could be stored in the data storage unit 102. Further, the data analyzer might generate a plurality of count values per unit of time, and then average those count values per unit of time over a much larger period of time. For instance, the data analyzer 104 might count the number of debris events that occur during each hour of a day, and then calculate an average of the counts per hour to come up with an average per hour count for that day. The average per hour count for that day could then be stored in the data storage unit 102. In still other embodiments, the debris event count could be calculated and stored in other ways.

The data analyzer 104 might also determine the maximum amplitude of the accelerometer signal during each debris event. This maximum amplitude could be stored for each debris event in the data storage unit 102. In some embodiments, the data analyzer 104 might note the maximum amplitude for each of a plurality of debris events that occur over a predetermined period of time, and data analyzer 104 could then calculate an average of the amplitudes. This average amplitude for that unit of time could then be stored in the data storage unit 102.

In still other embodiments, the data analyzer might calculate and store combinations of the event count and the maximum amplitudes for a particular period of time. For instance, the data analyzer might determine the number of debris events which occur for a predetermined period of time, and the average of the maximum amplitudes for those debris events, and these two numbers could then be multiplied to create a damage index which is then stored in the data storage unit 102.

When a debris event occurs, and the amplitude of the accelerometer signal suddenly rises and crosses one of the thresholds, one expects that the amplitude of the signal will gradually decrease immediately thereafter. In other words, one expects a debris event to occur over a relatively short period of time. The fact that the period of time for a typical debris event can be bounded, allows the system to accurately determine a maximum amplitude of the accelerometer signal for each debris event. For instance, with reference to FIG. 4, one could detect the start of a debris event by noting when the amplitude of the accelerometer signal crosses the higher of the threshold values. One could then monitor the accelerometer signal for a predetermined period of time after the event start time, and detect the maximum amplitude of the accelerometer signal within that period of time. If the accelerometer signal rises above the event threshold again after the predetermined period of time has elapsed, the second crossing of the threshold would count that as a second debris event.

If one were to count a debris event each time that the accelerometer signal peaks and then begins to trend downward, it could lead to counting a single debris event as two or more debris events. For instance, in the accelerometer signal illustrated in FIG. 4, one can see that a first maximum amplitude is achieved shortly after the debris event start time, and that the amplitude of the signal then begins to move downward. But a second even larger peak amplitude occurs slightly later. If one were to count each peak as a different debris event, this debris event would be counted twice.

To eliminate the double counting problem, one can use an event timer. When the amplitude of the accelerometer signal rises to a first peak and then begins to decline, the data analyzer would begin an event timer that counts down to zero. If the amplitude of the accelerometer signal does not reach a new higher peak before the event timer runs out, then there would be a single debris event. However, if the amplitude of the accelerometer signal reaches a second higher peak before the event timer runs out, the event timer would be reset, and it would begin to run again. And the new higher peak would not be counted as a second debris event. Both the first peak and the second higher peak would be considered part of a single debris event.

Another approach is to use a decay envelope, which is illustrated in FIG. 4 as a dotted line that slopes downward from each peak amplitude. In this approach, when the amplitude of the accelerometer peaks and begins to decline, a decay envelope is established. Then, if the amplitude of the accelerometer signal exceeds the decay envelope before passing back under the threshold value, one would use the new peak to establish a new decay envelope which starts at the second peak. In this approach, a new peak amplitude of the accelerometer signal would not need to exceed the actual value of the previous peak, it would only need to exceed the decay envelope. This approach would also help to prevent counting a single debris event as multiple events.

The failure prediction system 100 also includes an interface 108. The interface 108 could be used to allow maintenance personnel to download the values stored in the data storage unit 102. In addition, the interface could be used to update the values or algorithms used by the data analyzer 104 or the failure prediction unit 106.

The failure prediction system 100 could also include a transmitter 110. The transmitter 110 could be a wireless transmitter or a wired transmitting device that couples the failure prediction system 100 to some other entity, such as a maintenance system that tracks the condition of multiple gear assemblies. The failure prediction system could be configured to report the data being analyzed and stored on a periodic basis to a central maintenance authority. Alternatively, a central maintenance authority could query the failure prediction system 100 to obtain the analyzed and stored data. In this instance, the query could be received by the interface 108, or the transmitter might instead be a transceiver that is capable of receiving and transmitting information.

The data obtained and analyzed by the failure prediction system could be reported in any number of different ways. In some instances, the failure prediction system could calculate a damage index for a gear assembly and report that damage index. The damage index could provide an indication whether the gear assembly is approaching failure.

In some simple embodiments, the damage index could represent the current number of debris events which are occurring per unit of time. In slightly more complex embodiments, the damage index could represent the rate of change of the number of debris events per unit of time.

In still other embodiments, the damage index could represent the maximum amplitude of the accelerometer signal or an average of the maximum amplitudes for a given unit of time. In more complex embodiments, the damage index could represent the rate of change, or rate of increase, in the maximum amplitude or the average of the maximum amplitudes of debris events over a unit of time.

In still other embodiments, the damage index could take into account the total number of debris events that have occurred, the number of debris events which are occurring per unit of time, and the maximum amplitude or maximum amplitude average for those debris events over a unit of time. Further, the damage index could indicate a trend or rate of change of some calculated number which is based upon both the debris event count and the maximum amplitude of the debris events.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of monitoring a condition of a gear assembly, comprising:
    receiving a signal from a vibration detector attached to a portion of the gear assembly;
    analyzing the vibration detector signal with a processor to determine when debris particles pass between meshing parts of the gear assembly; and
    counting the number of times that a debris particle passes between meshing parts of the gear assembly over a predetermined period of time to generate an event count.

2. The method of claim 1, wherein the analyzing step comprises:
    periodically comparing an amplitude of the vibration detector signal to a threshold value;
    determining that a debris particle has passed between meshing parts of the gear assembly each time that the amplitude of the vibration detector signal exceeds the threshold value.

3. The method of claim 2, wherein the amplitude of the vibration detector signal is compared to a predetermined default threshold.

4. The method of claim 2, wherein the amplitude of the vibration detector signal is compared to an adaptive threshold that varies over time.

5. The method of claim 2, wherein the amplitude of the vibration detector signal is compared to an adaptive threshold that gradually increases over time.

6. The method of claim 2, further comprising determining the maximum amplitude of the vibration detector signal each time that it is determined that a debris particle has passed through meshing parts of the gear assembly.

7. The method of claim 6, further comprising calculating a damage index that is based on a number of times that a debris particle passes through the gear assembly per unit of time, and the maximum amplitude of the vibration detector signal each time that a debris particle passes through meshing parts of the gear assembly.

8. The method of claim 6, further comprising calculating a damage index which is based on a number of times that a debris particle passes through the gear assembly per unit of time, and an average of the maximum amplitude of the vibration detector signal each time that a debris particle passes through meshing parts of the gear assembly per unit of time.

9. The method of claim 1, further comprising calculating a damage index which is based on a rate of change of the event count.

10. A method of calculating a damage index for a gear assembly, comprising:
    receiving a signal from a vibration detector attached to a portion of the gear assembly;
    analyzing the signal from the vibration detector with a processor to determine each time that a debris particle has passed between meshing parts of the gear assembly, wherein the analysis comprises determining when an amplitude of the vibration detector signal exceeds a threshold value;
    counting the number of times that a debris particle passes between meshing parts of the gear assembly over a predetermined period of time to generate an event count; and
    calculating a damage index for the gear assembly based on the event count.

11. The method of claim 10, wherein the damage index is also based on how the event count changes over time.

12. The method of claim 10, further comprising determining the maximum amplitude of the vibration detector signal each time that it is determined that a debris particle has passed between meshing parts of the gear assembly, wherein the damage index is also based on the recorded maximum amplitudes.

13. The method of claim 12, wherein the damage index is based on an average of the maximum amplitudes of the vibration detector signal for a predetermined period of time.

14. The method of claim 12, further comprising calculating how the damage index changes over time.

15. A system for detecting conditions in a gear assembly, comprising:
    a vibration detector that is attached to a portion of the gear assembly;
    a processor that compares an amplitude of a signal from the vibration detector to a threshold value and that determines that a debris particle has passed between meshing parts of the gear assembly when the amplitude of the vibration detector signal exceeds the threshold value; and
    a data analyzing unit that calculates a damage index for the gear assembly based on a number of times that a debris particle passes between meshing parts of the gear assembly per unit of time.

16. The system of claim 15, wherein the vibration detector is attached to one of a fixed gear of the gear assembly and a mounting structure to which a fixed gear of the gear assembly is attached.

17. The system of claim 15, wherein the processor also determines the maximum amplitude of the vibration detector signal each time that a debris particle passes between meshing parts of a gear assembly.

18. The system of claim 15, wherein the data analyzing unit also calculates the damage index based on changes in the number of times that a debris particle passes between meshing parts of the gear assembly per unit time.

19. The system of claim 18, wherein the damage index is also based on an average of the maximum amplitudes of the vibration detector signal each time that a debris particle passes between meshing parts of a gear assembly per unit time.

20. A method of monitoring a condition of a gear assembly, comprising:
    receiving a signal from a vibration detector attached to a portion of the gear assembly; and
    comparing an amplitude of the vibration detector signal to an adaptive threshold that varies over time with a processor to determine when debris particles pass between meshing parts of the gear assembly,
    wherein the comparing step comprises comparing an amplitude of the vibration detector signal to an adaptive threshold that is based on an average of an amplitude of the vibration detector signal when no debris particles are passing between meshing parts of the gear assembly.

21. The method of claim 20, wherein the comparing step comprises comparing an amplitude of the vibration detector signal to an adaptive threshold that gradually increases over time.

22. A method of monitoring a condition of a gear assembly, comprising:
    receiving a signal from a vibration detector attached to a portion of the gear assembly; and
    comparing an amplitude of the vibration detector signal to an adaptive threshold that varies over time with a processor to determine when debris particles pass between meshing parts of the gear assembly,
    wherein the comparing step comprises comparing an amplitude of the vibration detector signal to an adaptive threshold that varies based on a rotational speed of the meshing parts of the gear assembly.

23. A method of monitoring a condition of a gear assembly, comprising:
    receiving a signal from a vibration detector attached to a portion of the gear assembly;
    analyzing the vibration detector signal with a processor to determine when debris particles pass between meshing parts of the gear assembly;
    determining a maximum amplitude of the vibration detector signal during each occurrence of a debris particle passing between meshing parts of the gear assembly;
    calculating an average of the determined maximum amplitudes of the vibration detector signal per unit of time; and
    calculating a damage index which is based on the calculated average of the determined maximum amplitudes.

24. The method of claim 23, wherein the damage index is also calculated based on a rate of change of the calculated average of the determined maximum amplitudes.

25. A method of monitoring a condition of a gear assembly, comprising:
    receiving a signal from a vibration detector attached to a portion of the gear assembly;
    analyzing the vibration detector signal with a processor to determine when debris particles pass between meshing parts of the gear assembly;
    determining a maximum amplitude of the vibration detector signal during each occurrence of a debris particle passing between meshing parts of the gear assembly;
    determining a rate of change of the determined maximum amplitudes; and
    calculating a damage index which is based on the determined rate of change of the determined maximum amplitudes.

26. The method of claim 25, further comprising calculating an average of the determined maximum amplitudes of the vibration detector signal per unit of time, and wherein the damage index is also based on the calculated average of the determined maximum amplitudes.

\* \* \* \* \*